US008017898B2

(12) United States Patent
Lu et al.

(10) Patent No.: US 8,017,898 B2
(45) Date of Patent: Sep. 13, 2011

(54) VEHICULAR IMAGING SYSTEM IN AN AUTOMATIC HEADLAMP CONTROL SYSTEM

(75) Inventors: Yuesheng Lu, Farmington Hill, MI (US); Michael J. Higgins-Luthman, Livonia, MI (US); Antony V. Jeyaraj, Bangalore (IN); Manoj R. Phirke, Bangalore (IN)

(73) Assignee: Magna Electronics Inc., Holly, MI (US)

( * ) Notice: Subject to any disclaimer, the term of this patent is extended or adjusted under 35 U.S.C. 154(b) by 280 days.

(21) Appl. No.: 12/190,698

(22) Filed: Aug. 13, 2008

(65) Prior Publication Data

US 2009/0045323 A1 Feb. 19, 2009

Related U.S. Application Data

(60) Provisional application No. 60/956,633, filed on Aug. 17, 2007.

(51) Int. Cl.
*H01L 27/00* (2006.01)
*G08G 1/017* (2006.01)
(52) U.S. Cl. ..................... 250/208.1; 340/937
(58) Field of Classification Search .............. 250/208.1, 250/214.1, 214 R, 206, 205, 221, 574, 559.4; 340/937, 936, 935, 436–467, 468, 469, 471–479, 340/540, 435; 359/875, 877, 843, 872, 605, 359/855, 865, 604, 601, 565, 504, 570, 876, 359/613, 229, 230; 348/118, 148, 143; 382/104, 382/106, 274
See application file for complete search history.

(56) References Cited

U.S. PATENT DOCUMENTS

| | | | |
|---|---|---|---|
| 2,632,040 | A | 3/1953 | Rabinow |
| 2,827,594 | A | 3/1958 | Rabinow |
| 3,141,393 | A | 7/1964 | Platt |

(Continued)

FOREIGN PATENT DOCUMENTS

DE 2133182 1/1973

(Continued)

OTHER PUBLICATIONS

Pollastri F. "Projection Center Calibration by Motion", Pattern Recognition Letters, Elsevier, Amsterdam, NL, vol. 14, No. 12, Dec. 1, 1993, pp. 975-983, XP002363595, ISSN:0167-8655.

(Continued)

*Primary Examiner* — Que T Le
*Assistant Examiner* — Jennifer Bennett
(74) *Attorney, Agent, or Firm* — Gardner, Linn, Burkhart & Flory, LLP

(57) ABSTRACT

A vehicular imaging system includes a forward facing photosensor array and a control responsive to the photosensor array. The control processes an image data set indicative of captured images, and the control processes a reduced image data set of the image data set to determine whether an object of interest is within a target zone of the captured image. The reduced image data set is representative of a portion of the captured images as captured by a particular grouping of the photosensor elements. The control adjusts the reduced image data set so as to be representative of a portion of the captured images as captured by a different particular grouping of the photosensor elements, and adjusts the reduced image data set in response to a determination of a change in a focus of expansion of the captured images.

19 Claims, 4 Drawing Sheets

U.S. PATENT DOCUMENTS

| | | | |
|---|---|---|---|
| 3,601,614 A | 8/1971 | Platzer | |
| 3,612,666 A | 10/1971 | Rabinow | |
| 3,665,224 A | 5/1972 | Kelsey | |
| 3,680,951 A | 8/1972 | Jordan | |
| 3,689,695 A | 9/1972 | Rosenfield et al. | |
| 3,708,231 A | 1/1973 | Walters | |
| 3,746,430 A | 7/1973 | Brean | |
| 3,807,832 A | 4/1974 | Castellion | |
| 3,811,046 A | 5/1974 | Levick | |
| 3,813,540 A | 5/1974 | Albrecht | |
| 3,862,798 A | 1/1975 | Hopkins | |
| 3,947,095 A | 3/1976 | Moultrie | 350/302 |
| 3,962,600 A | 6/1976 | Pittman | |
| 3,985,424 A | 10/1976 | Steinacher | |
| 3,986,022 A | 10/1976 | Hyatt | |
| 4,037,134 A | 7/1977 | Löper | |
| 4,052,712 A | 10/1977 | Ohama et al. | |
| 4,093,364 A | 6/1978 | Miller | |
| 4,111,720 A | 9/1978 | Michel et al. | |
| 4,161,653 A | 7/1979 | Bedini | |
| 4,200,361 A | 4/1980 | Malvano | |
| 4,214,266 A | 7/1980 | Myers | |
| 4,236,099 A | 11/1980 | Rosenblum | |
| 4,247,870 A | 1/1981 | Gabel et al. | |
| 4,249,160 A | 2/1981 | Chilvers | |
| 4,266,856 A | 5/1981 | Wainwright | |
| 4,277,804 A | 7/1981 | Robison | |
| 4,281,898 A | 8/1981 | Ochiai | |
| 4,288,814 A | 9/1981 | Talley et al. | |
| 4,355,271 A | 10/1982 | Noack | |
| 4,357,558 A | 11/1982 | Massoni et al. | |
| 4,381,888 A | 5/1983 | Momiyama | 350/458 |
| 4,420,238 A | 12/1983 | Felix | |
| 4,431,896 A | 2/1984 | Lodetti | |
| 4,443,057 A | 4/1984 | Bauer | |
| 4,460,831 A | 7/1984 | Oettinger et al. | |
| 4,481,450 A | 11/1984 | Watanabe et al. | 318/444 |
| 4,491,390 A | 1/1985 | Tong-Shen | |
| 4,512,637 A | 4/1985 | Ballmer | |
| 4,529,275 A | 7/1985 | Ballmer | |
| 4,529,873 A | 7/1985 | Ballmer | |
| 4,549,208 A | 10/1985 | Kamejima et al. | |
| 4,571,082 A | 2/1986 | Downs | |
| 4,572,619 A | 2/1986 | Reininger | |
| 4,580,875 A | 4/1986 | Bechtel | |
| 4,603,946 A | 8/1986 | Kato | |
| 4,614,415 A | 9/1986 | Hyatt | |
| 4,620,141 A | 10/1986 | McCumber et al. | 318/483 |
| 4,623,222 A | 11/1986 | Itoh | |
| 4,626,850 A | 12/1986 | Chey | |
| 4,629,941 A | 12/1986 | Ellis | |
| 4,630,109 A | 12/1986 | Barton | |
| 4,632,509 A | 12/1986 | Ohmi | |
| 4,647,161 A | 3/1987 | Müller | 350/462 |
| 4,653,316 A | 3/1987 | Fukuhara | |
| 4,669,825 A | 6/1987 | Itoh | |
| 4,669,826 A | 6/1987 | Itoh | |
| 4,671,615 A | 6/1987 | Fukada | |
| 4,672,457 A | 6/1987 | Hyatt | |
| 4,676,601 A | 6/1987 | Itoh | |
| 4,690,508 A | 9/1987 | Jacob | |
| 4,692,798 A | 9/1987 | Seko et al. | |
| 4,697,883 A | 10/1987 | Suzuki | |
| 4,701,022 A | 10/1987 | Jacob | |
| 4,713,685 A | 12/1987 | Nishimura et al. | |
| 4,727,290 A | 2/1988 | Smith et al. | |
| 4,731,669 A | 3/1988 | Hayashi et al. | |
| 4,741,603 A | 5/1988 | Miyagi | |
| 4,768,135 A | 8/1988 | Kretschmer et al. | |
| 4,789,904 A | 12/1988 | Peterson | |
| 4,793,690 A | 12/1988 | Gahan | |
| 4,817,948 A | 4/1989 | Simonelli | |
| 4,820,933 A | 4/1989 | Hong | |
| 4,825,232 A | 4/1989 | Howdle | |
| 4,838,650 A | 6/1989 | Stewart | |
| 4,847,772 A | 7/1989 | Michalopoulos et al. | |
| 4,862,037 A | 8/1989 | Farber et al. | |
| 4,867,561 A | 9/1989 | Fujii et al. | 356/237 |
| 4,871,917 A | 10/1989 | O'Farrell et al. | |
| 4,872,051 A | 10/1989 | Dye | |
| 4,881,019 A | 11/1989 | Shiraishi et al. | |
| 4,886,960 A | 12/1989 | Molyneux | |
| 4,891,559 A | 1/1990 | Matsumoto et al. | |
| 4,892,345 A | 1/1990 | Rachael, III | |
| 4,895,790 A | 1/1990 | Swanson et al. | 430/321 |
| 4,896,030 A | 1/1990 | Miyaji | |
| 4,910,591 A | 3/1990 | Petrossian et al. | |
| 4,916,374 A | 4/1990 | Schierbeek | |
| 4,917,477 A | 4/1990 | Bechtel et al. | |
| 4,937,796 A | 6/1990 | Tendler | |
| 4,956,591 A | 9/1990 | Schierbeek | |
| 4,961,625 A | 10/1990 | Wood et al. | |
| 4,967,319 A | 10/1990 | Seko | |
| 4,970,653 A | 11/1990 | Kenue | |
| 4,974,078 A | 11/1990 | Tsai | |
| 4,987,357 A | 1/1991 | Masaki | |
| 4,991,054 A | 2/1991 | Walters | |
| 5,001,558 A | 3/1991 | Burley et al. | |
| 5,003,288 A | 3/1991 | Wilhelm | |
| 5,012,082 A | 4/1991 | Watanabe | |
| 5,016,977 A | 5/1991 | Baude et al. | 350/162.17 |
| 5,027,001 A | 6/1991 | Torbert | 307/10.1 |
| 5,027,200 A | 6/1991 | Petrossian et al. | |
| 5,044,706 A | 9/1991 | Chen | 359/357 |
| 5,055,668 A | 10/1991 | French | |
| 5,059,877 A | 10/1991 | Teder | 318/444 |
| 5,064,274 A | 11/1991 | Alten | |
| 5,072,154 A | 12/1991 | Chen | |
| 5,086,253 A | 2/1992 | Lawler | |
| 5,096,287 A | 3/1992 | Kakinami et al. | |
| 5,121,200 A | 6/1992 | Choi | |
| 5,124,549 A | 6/1992 | Michaels et al. | |
| 5,148,014 A | 9/1992 | Lynam | |
| 5,168,378 A | 12/1992 | Black | |
| 5,170,374 A | 12/1992 | Shimohigashi et al. | |
| 5,172,235 A | 12/1992 | Wilm et al. | |
| 5,182,502 A | 1/1993 | Slotkowski et al. | |
| 5,184,956 A | 2/1993 | Langlais et al. | |
| 5,193,029 A | 3/1993 | Schofield | |
| 5,204,778 A | 4/1993 | Bechtel | |
| 5,208,701 A | 5/1993 | Maeda | 359/574 |
| 5,245,422 A | 9/1993 | Borcherts et al. | |
| 5,253,109 A | 10/1993 | O'Farrell | |
| 5,276,389 A | 1/1994 | Levers | |
| 5,289,182 A | 2/1994 | Brillard et al. | |
| 5,289,321 A | 2/1994 | Secor | |
| 5,305,012 A | 4/1994 | Faris | |
| 5,307,136 A | 4/1994 | Saneyoshi | |
| 5,313,072 A | 5/1994 | Vachss | |
| 5,325,096 A | 6/1994 | Pakett | |
| 5,325,386 A | 6/1994 | Jewell et al. | |
| 5,329,206 A | 7/1994 | Slotkowski et al. | |
| 5,331,312 A | 7/1994 | Kudoh | |
| 5,336,980 A | 8/1994 | Levers | 318/444 |
| 5,341,437 A | 8/1994 | Nakayama | |
| 5,351,044 A | 9/1994 | Mathur et al. | |
| 5,355,118 A | 10/1994 | Fukuhara | |
| 5,374,852 A | 12/1994 | Parkes | |
| 5,386,285 A | 1/1995 | Asayama | |
| 5,406,395 A | 4/1995 | Wilson et al. | 359/15 |
| 5,410,346 A | 4/1995 | Saneyoshi et al. | |
| 5,414,257 A | 5/1995 | Stanton | 250/227.25 |
| 5,414,461 A | 5/1995 | Kishi et al. | 348/115 |
| 5,416,318 A | 5/1995 | Hegyi | |
| 5,424,952 A | 6/1995 | Asayama | 364/443 |
| 5,426,294 A | 6/1995 | Kobayashi et al. | |
| 5,430,431 A | 7/1995 | Nelson | |
| 5,440,428 A | 8/1995 | Hegg et al. | |
| 5,444,478 A | 8/1995 | Lelong et al. | |
| 5,451,822 A | 9/1995 | Bechtel et al. | |
| 5,457,493 A | 10/1995 | Leddy et al. | |
| 5,461,357 A | 10/1995 | Yoshioka et al. | |
| 5,461,361 A | 10/1995 | Moore | |
| 5,469,298 A | 11/1995 | Suman et al. | |
| 5,471,515 A | 11/1995 | Fossum et al. | |
| 5,475,494 A | 12/1995 | Nishida et al. | |
| 5,487,116 A | 1/1996 | Nakano et al. | |

| | | | |
|---|---|---|---|
| 5,498,866 A | 3/1996 | Bendicks et al. ......... 250/227.25 |
| 5,510,983 A | 4/1996 | Iino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. ............... 340/435 |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. ............ 359/604 |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,614,788 A | 3/1997 | Mullins et al. |
| 5,634,709 A | 6/1997 | Iwama |
| 5,648,835 A | 7/1997 | Uzawa ........................... 396/429 |
| 5,650,944 A | 7/1997 | Kise |
| 5,660,454 A | 8/1997 | Mori et al. |
| 5,661,303 A | 8/1997 | Teder ........................ 250/341.8 |
| 5,670,935 A | 9/1997 | Schofield et al. ............ 340/461 |
| 5,675,489 A | 10/1997 | Pomerleau |
| 5,757,949 A | 5/1998 | Kinoshita et al. |
| 5,760,826 A | 6/1998 | Nayar ........................... 348/36 |
| 5,760,828 A | 6/1998 | Cortes ........................ 348/143 |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,793,308 A | 8/1998 | Rosinski et al. |
| 5,793,420 A | 8/1998 | Schmidt |
| 5,796,094 A * | 8/1998 | Schofield et al. .......... 250/208.1 |
| 5,798,575 A | 8/1998 | O'Farrell et al. |
| 5,837,994 A | 11/1998 | Stam et al. ................. 250/208.1 |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. ............. 340/435 |
| 5,850,254 A | 12/1998 | Takano et al. |
| 5,867,591 A | 2/1999 | Onda ........................... 382/154 |
| 5,877,897 A * | 3/1999 | Schofield et al. ............ 359/604 |
| 5,883,739 A | 3/1999 | Ashihara et al. ............. 359/462 |
| 5,890,021 A | 3/1999 | Onoda ........................... 396/121 |
| 5,896,085 A | 4/1999 | Mori et al. .................... 340/469 |
| 5,923,027 A | 7/1999 | Stam et al. ................. 250/208.1 |
| 5,949,331 A | 9/1999 | Schofield et al. ............ 340/461 |
| 5,959,555 A | 9/1999 | Furuta |
| 5,963,247 A | 10/1999 | Banitt |
| 5,990,469 A | 11/1999 | Bechtel et al. ............. 250/208.1 |
| 6,020,704 A | 2/2000 | Buschur ........................ 318/483 |
| 6,049,171 A | 4/2000 | Stam et al. ..................... 315/82 |
| 6,066,933 A | 5/2000 | Ponziana |
| 6,084,519 A | 7/2000 | Coulling et al. |
| 6,087,953 A | 7/2000 | DeLine et al. ............ 340/815.4 |
| 6,097,023 A | 8/2000 | Schofield et al. |
| 6,097,024 A | 8/2000 | Stam et al. ................. 250/208.1 |
| 6,124,886 A | 9/2000 | DeLine et al. ................. 348/148 |
| 6,144,022 A | 11/2000 | Tennenbaum et al. ..... 250/208.1 |
| 6,172,613 B1 | 1/2001 | DeLine et al. ............ 340/815.4 |
| 6,201,642 B1 | 3/2001 | Bos .............................. 359/565 |
| 6,222,447 B1 | 4/2001 | Schofield et al. ............ 340/461 |
| 6,243,003 B1 | 6/2001 | DeLine et al. |
| 6,302,545 B1 | 10/2001 | Schofield et al. |
| 6,313,454 B1 * | 11/2001 | Bos et al. .................... 250/208.1 |
| 6,320,176 B1 | 11/2001 | Schofield et al. |
| 6,396,397 B1 | 5/2002 | Shiraishi et al. |
| 6,411,328 B1 | 6/2002 | Franke et al. |
| 6,424,273 B1 | 7/2002 | Gutta et al. .................... 340/937 |
| 6,433,676 B2 | 8/2002 | DeLine et al. |
| 6,442,465 B2 | 8/2002 | Breed et al. |
| 6,498,620 B2 | 12/2002 | Schofield et al. |
| 6,523,964 B2 | 2/2003 | Schofield et al. |
| 6,534,884 B2 | 3/2003 | Marcus et al. ................. 307/10.1 |
| 6,553,130 B1 | 4/2003 | Lemelson et al. ............ 382/104 |
| 6,559,435 B2 | 5/2003 | Schofield et al. |
| 6,611,202 B2 | 8/2003 | Schofield et al. |
| 6,636,258 B2 | 10/2003 | Strumolo ....................... 348/149 |
| 6,650,233 B2 | 11/2003 | DeLine et al. |
| 6,672,731 B2 | 1/2004 | Schnell et al. ................. 359/877 |
| 6,717,610 B1 | 4/2004 | Bos et al. ........................ 348/148 |
| 6,802,617 B2 | 10/2004 | Schofield et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,953,253 B2 | 10/2005 | Schofield et al. |
| 6,975,775 B2 | 12/2005 | Rykowski et al. |
| 7,038,577 B2 * | 5/2006 | Pawlicki et al. ............... 340/435 |
| 7,062,300 B1 | 6/2006 | Kim |
| 7,227,459 B2 | 6/2007 | Bos et al. |
| 2002/0015153 A1 | 2/2002 | Downs |
| 2002/0126875 A1 | 9/2002 | Naoi et al. |
| 2004/0051634 A1 | 3/2004 | Schofield et al. |
| 2004/0114381 A1 | 6/2004 | Salmeen et al. |
| 2004/0143380 A1 | 7/2004 | Stam et al. |
| 2004/0200948 A1 | 10/2004 | Bos et al. |
| 2005/0146792 A1 | 7/2005 | Schofield et al. |
| 2005/0200700 A1 | 9/2005 | Schofield et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0091813 A1 | 5/2006 | Stam et al. |
| 2006/0125919 A1 * | 6/2006 | Camilleri et al. ............. 348/148 |
| 2007/0023613 A1 | 2/2007 | Schofield et al. |
| 2007/1002361 | 2/2007 | Schofield et al. |
| 2007/0109406 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0120706 A1 | 5/2007 | Schofield et al. |
| 2007/0176080 A1 | 8/2007 | Schofield et al. |
| 2007/0242339 A1 * | 10/2007 | Bradley ....................... 359/237 |
| 2008/0069402 A1 * | 3/2008 | Dhua et al. ................... 382/104 |
| 2010/0214791 A1 * | 8/2010 | Schofield ..................... 362/466 |

FOREIGN PATENT DOCUMENTS

| | | |
|---|---|---|
| DE | 2808260 | 8/1979 |
| DE | 3041612 | 11/1980 |
| DE | P 2931368 A1 | 2/1981 |
| DE | 2946561 A | 5/1981 |
| DE | 3041692 | 5/1981 |
| DE | 3248511 A1 | 7/1984 |
| DE | 4107965 A1 | 9/1991 |
| DE | 4118208 | 11/1991 |
| DE | 4139515 A1 | 6/1992 |
| DE | 4123641 A1 | 1/1993 |
| DE | 102004048400 A1 | 4/2006 |
| EP | 48506 | 6/1985 |
| EP | 0202460 | 11/1986 |
| EP | 48810 | 10/1988 |
| EP | 0416222 A2 | 3/1991 |
| EP | 0426503 | 5/1991 |
| EP | 0450553 A2 | 10/1991 |
| EP | 0492591 | 7/1992 |
| EP | 0513476 A1 | 11/1992 |
| EP | 0788947 | 8/1997 |
| EP | 0669559 | 8/1999 |
| EP | 0830267 B1 | 12/2001 |
| FR | 2241085 | 4/1973 |
| FR | 2513198 | 3/1983 |
| FR | 2585991 | 2/1987 |
| FR | 2 641 237 A1 | 7/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | 2119087 | 11/1983 |
| GB | 2137373 | 10/1984 |
| GB | 2137573 A | 10/1984 |
| GB | 2156295 | 10/1985 |
| GB | 2244187 A | 11/1991 |
| GB | 2255539 A | 11/1992 |
| GB | 2267341 | 12/1993 |

| | | |
|---|---|---|
| GB | 2327823 A | 2/1999 |
| JP | 5630305 | 8/1979 |
| JP | 55039843 | 3/1980 |
| JP | 57-173801 | 10/1982 |
| JP | 57-208530 | 12/1982 |
| JP | 58-19941 | 12/1982 |
| JP | 57-208531 | 2/1983 |
| JP | 58110334 | 6/1983 |
| JP | 58209635 | 12/1983 |
| JP | 59-51325 | 3/1984 |
| JP | 5951301 | 4/1984 |
| JP | 59114139 | 7/1984 |
| JP | 59133336 | 9/1984 |
| JP | 6080953 | 5/1985 |
| JP | 0-212730 | 10/1985 |
| JP | 60166651 | 11/1985 |
| JP | 60261275 | 12/1985 |
| JP | 6154942 | 4/1986 |
| JP | 6156638 | 4/1986 |
| JP | 6243543 | 2/1987 |
| JP | 62-131837 | 6/1987 |
| JP | 62122487 | 6/1987 |
| JP | 62122844 | 6/1987 |
| JP | 6414700 | 1/1989 |
| JP | 01123587 | 5/1989 |
| JP | 30061192 | 3/1991 |
| JP | 03099952 | 4/1991 |
| JP | 042394 | 11/1991 |
| JP | 3284413 | 12/1991 |
| JP | 4114587 | 4/1992 |
| JP | 40245886 | 9/1992 |
| JP | 50000638 | 1/1993 |
| JP | 0550883 | 3/1993 |
| JP | 0577657 | 3/1993 |
| JP | 5213113 | 8/1993 |
| JP | 6107035 | 4/1994 |
| JP | 6227318 | 8/1994 |
| JP | 06-267304 | 9/1994 |
| JP | 06276524 A | 9/1994 |
| JP | 06-295601 | 10/1994 |
| JP | 074170 | 1/1995 |
| JP | 7-32936 | 2/1995 |
| JP | 7-47878 | 2/1995 |
| JP | 7-052706 | 2/1995 |
| JP | 7-69125 | 3/1995 |
| JP | 07105496 | 4/1995 |
| JP | 08166221 | 6/1996 |
| JP | 2630604 | 4/1997 |
| WO | WO 86/05147 | 9/1986 |
| WO | WO-9419212 A | 9/1994 |
| WO | 9427262 | 11/1994 |
| WO | WO 9621581 A | 7/1996 |
| WO | 9638319 | 12/1996 |
| WO | 9735743 | 10/1997 |
| WO | WO 9735743 | 10/1997 |
| WO | 9814974 | 4/1998 |
| WO | 9858450 | 12/1998 |
| WO | 9914088 | 3/1999 |
| WO | 9923828 | 5/1999 |

OTHER PUBLICATIONS

Hamit, Francis "360-Degree Interactivity: New Video and Still Cameras Provide a Global Roaming Viewpoint", *Advanced Imaging*, Mar. 1997, p. 50.

Johannes, Laura "A New Microchip Ushers in Cheaper Digital Cameras", *The Wall Street Journal*, Aug. 21, 1998, p. B1.

Article entitled "Generation of Vision Technology," published by VLSI Vision Limited, publication date unknown.

Article entitled "On-Chip CMOS Sensors for VLSI Imaging Systems," published by VLSI Vision Limited, 1991.

Wang, G., et al. "CMOS Video Cameras", IEEE, 1991, p. 100-103.

Ballard, Dana H. et al., "Computer Vision", 1982, p. 88-89, sect. 3.4.1.

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

Reexamination Control No. 90/007,519, Reexamination of U.S. Patent No. 6,222,447, issued to Schofield et al.

Reexamination Control No. 90/007,520, Reexamination of U.S. Patent No. 5,949,331, issued to Schofield et al.

Search Report from European Patent Application No. EP 96 91 6533.

\* cited by examiner

VEHICULAR IMAGING SYSTEM IN AN AUTOMATIC HEADLAMP CONTROL SYSTEM

CROSS REFERENCE TO RELATED APPLICATION

The present application claims the benefit of U.S. provisional application Ser. No. 60/956,633, filed Aug. 17, 2007, which is hereby incorporated herein by reference in its entirety.

FIELD OF THE INVENTION

The present invention relates to automatic headlamp control systems for vehicles and, more particularly, to automatic headlamp control systems that automatically adjust the high and low beam states of a vehicle headlamp.

BACKGROUND OF THE INVENTION

Automotive forward lighting systems are evolving in several areas including the use of image-based sensors, typically referred to as Automatic High Beam (AHB) control systems, to maximize the use of high beam road illumination when appropriate, the use of steerable beam systems, typically referred to as Adaptive Front Lighting (AFL) systems, to provide a greater range of beam pattern options particularly for driving on curved roads or during turn maneuvers wherein the beam pattern may be biased or supplemented in the direction of the curve or turn, and the combination of such AHB and AFL systems.

Automatic high beam control system are known that utilize an optical system, an image sensor, and signal processing including spectral, spatial and temporal techniques to determine ambient lighting conditions, the road environment, and the presence of other road users in order to automatically control the selection of the appropriate forward lighting state such that user forward vision is optimized while minimizing the impact of headlamp caused glare on other road users in all lighting conditions. Examples of such systems are described in U.S. Pat. Nos. 5,796,094; 6,097,023; 6,320,176; 6,559,435; 6,831,261; 6,396,397; 6,822,563; and 7,004,606, which are hereby incorporated herein by reference in their entireties.

While AHB systems that utilize the features and concepts described within the above identified U.S. patents have achieved performance levels that have resulted in considerable commercial success, it is desired to provide additional features and techniques, which may increase the utility, improve the performance, facilitate the manufacture, and simplify the installation of such systems.

SUMMARY OF THE INVENTION

The present invention provides an automatic headlamp control system that is operable to automatically control or adjust the high beam state of a vehicle's headlamps. The headlamp control system is operable to determine a focus of expansion pixel or pixels in the captured image and adjust the image processing in response to the location or pixel/pixels of the focus of expansion and the tracking of movement of detected light sources and other objects as the vehicle travels along the road. The headlamp control system of the present invention may provide reduced processing of image data to provide a low cost system.

According to an aspect of the present invention, a vehicular imaging system comprises a photosensor array comprising a plurality of photosensor elements and a control responsive to an output of the photosensor array. The photosensor array has a field of view forward of the vehicle that is generally in line with the vehicle's primary direction of forward travel. The photosensor array captures images of an area encompassed by the forward field of view. The control processes an image data set indicative of captured images. The control processes a reduced image data set of the image data set to determine whether an object of interest is within a target zone of the captured images. The reduced image data set is representative of a portion of the captured images as captured by a particular grouping of the photosensor elements. Responsive to a determination of a change in a focus of expansion of the captured images, the control adjusts the reduced image data set so as to be representative of a portion of the captured images as captured by a different particular grouping of the photosensor elements.

The control may be operable to adjust a state of a headlamp beam in response to the image processing. The focus of expansion comprises at least one photosensor element that initially detects a new light source in the field of view. The control may track the new light source as it expands in the captured images (such as while the relative distance between the controlled vehicle and the new light source decreases) to confirm that the new light source is indicative of an object of interest. The control may determine that the new light source is representative of a light source of a leading or approaching vehicle and the controlled vehicle and approaching vehicle are traveling along a substantially flat and substantially straight road, and the control may compare a location of the new light source (such as when it is at or near the targeted zone of interest) to an expected location of the light source to determine if there is an offset. The control may process many samples of new light sources to arrive at an optimal or enhanced offset. The control adjusts the reduced data set in response to determination of such an offset.

According to another aspect of the present invention, a vehicular imaging system includes a photosensor array having a plurality of photosensor elements and a control responsive to an output of the photosensor array. The photosensor array has a field of view forward of the vehicle that is generally in line with the vehicle's primary direction of forward travel. The photosensor array captures images of an area encompassed by the forward field of view. The control processes image data indicative of captured images, and is operable to selectively process the output of the photosensor array as an output from the photosensor array at two or more different resolutions. The control utilizes a single classifying parameter for identifying a particular object of interest in the forward field of view for all of the at least two resolutions.

Optionally, for example, the at least two different resolutions may comprise (a) an output of a higher resolution photosensor array, (b) an output of a medium resolution photosensor array, and (c) an output of a lower resolution photosensor array. The control may process the output of the photosensor array at different resolutions in response to one of (a) a location of a detected light source and (b) a distance between the subject vehicle and a detected light source.

These and other objects, advantages, purposes and features of the present invention will become apparent upon review of the following specification in conjunction with the drawings.

DESCRIPTION OF THE PREFERRED EMBODIMENTS

Figure 1:
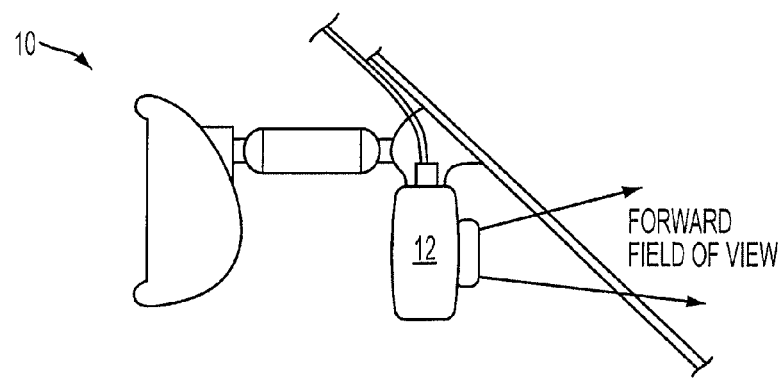
FIG. 1 is a side elevation of a portion of a vehicle embodying the present invention.
Figure 2:
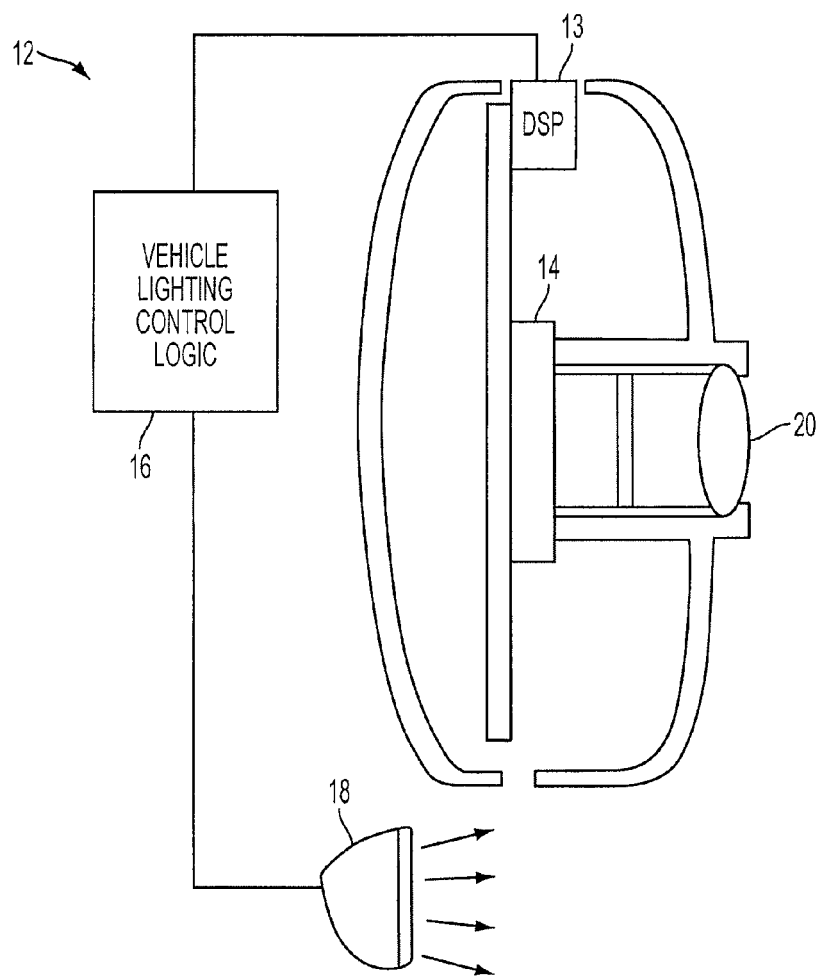
FIG. 2 is a partial side elevation view and block diagram of a vehicle headlight dimming control system according to the present invention.

Referring now to the drawings and the illustrative embodiments depicted therein, a vehicle 10 includes an automatic vehicle headlamp control system or vehicle headlamp dimming control system 12, which includes an image sensor 14 which senses light from a scene forward of vehicle 10, an imaging processor or control circuit 13 which receives data from image sensor 14 and processes the image data, and a vehicle lighting control logic module 16 which exchanges data with control circuit 13 and controls the headlamps 18 (such as by changing or retaining the state of the headlamps, such as between a higher beam state and a lower beam state) of vehicle 10 for the purpose of modifying the beam illumination state of the headlamps of the vehicle (FIGS. 1 and 2). The headlamps are operable to selectively emit a light output via a high beam lighting element and a lower beam or low beam lighting element. Headlamp dimming control 12 is operable to determine whether light sources in the image captured by the image sensor are or may be indicative of headlamps of oncoming vehicles or taillights of leading vehicles and is operable to adjust the headlamps of the controlled vehicle between a high beam state and a lower beam state or low beam state in response to such a determination. Headlamp dimming control 12 may utilize the principles disclosed in U.S. Pat. Nos. 5,796,094; 6,097,023; 6,320,176; 6,559,435; 6,831,261; 6,396,397; 6,822,563; and/or 7,004,606, which are hereby incorporated herein by reference in their entireties. Headlamp control 12 is operable to distinguish the light sources captured in the image between light sources representing headlamps and/or taillights of other vehicles, as discussed below.

The imaging sensor for the headlamp control of the present invention may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,498,620; 5,796,094; 6,097,023; 6,320,176; 6,559,435; 6,831,261; 6,806,452; 6,396,397; 6,822,563; 6,946,978; 7,038,577; and/or 7,004,606; and/or U.S. patent application Ser. No. 11/315,675, filed Dec. 22, 2005 and published Aug. 17, 2006 as U.S. Patent Publication No. US-2006-0184297A1; and/or U.S. provisional applications, Ser. No. 60/845,381, filed Sep. 18, 2006; and Ser. No. 60/837,408, filed Aug. 11, 2006; and/or PCT Application No. PCT/US2007/075702, filed Aug. 10, 2007, and published Feb. 28, 2008 as PCT Publication No. WO 2008/024639, and/or PCT Application No. PCT/US2003/036177, filed Nov. 14, 2003, and published Jun. 3, 2004 as PCT Publication No. WO 2004/047421 A3, which are all hereby incorporated herein by reference in their entireties. The control 12 may include a lens element or optic 20 between the image sensor and the forward scene to substantially focus the scene at an image plane of the image sensor. Optionally, the optic may comprise an asymmetric optic, which focuses a generally central portion of the scene onto the image sensor, while providing classical distortion on the periphery of the scene or field of view.

Such imaging sensors or cameras are pixelated imaging array sensors having a photosensing array 15 of a plurality of photon accumulating or photosensing light sensors or pixels 15a (FIG. 3), which are arranged in a two-dimensional array of rows and columns on a semiconductor substrate. The camera established on the substrate or circuit board includes circuitry which is operable to individually access each photosensor pixel or element of the array of photosensor pixels and to provide an output or image data set associated with the individual signals to the control circuit 13, such as via an analog to digital converter (not shown). As camera 14 receives light from objects and/or light sources in the target scene, the control circuit 13 may then be operable to process the signal from at least some of the pixels to analyze the image data of the captured image, as discussed below.

Figure 3:
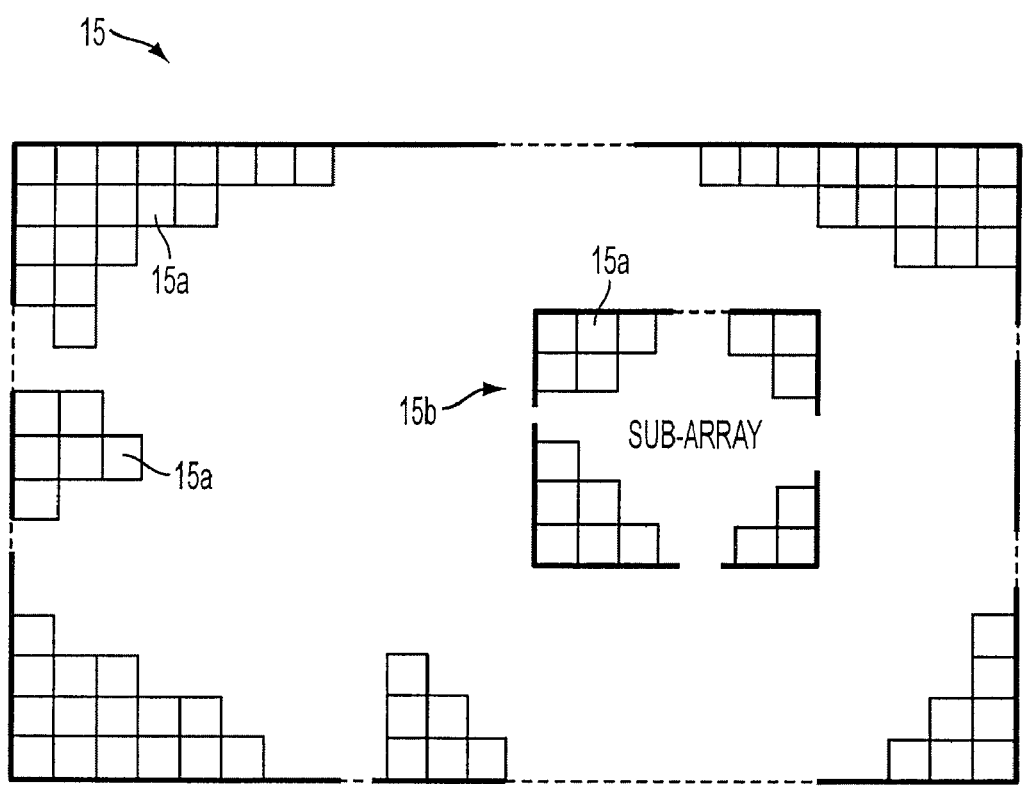
FIG. 3 is a schematic of an imaging array suitable for use with the control system of the present invention.

As shown in FIG. 3, the control may process one or more sub-arrays 15b of the photosensor array 15, where a particular sub-array may be representative of a zone or region of interest in the forward field of view of the camera. The control may process the sub-array of pixels while ignoring other pixels or processing other pixels at a reduced level (such as by utilizing aspects of the systems described in U.S. Pat. No. 7,038,577, which is hereby incorporated herein by reference in its entirety), and/or the control may process the sub-array of pixels in a particular manner (such as to determine if a light source is a vehicle lamp in the regions forward of the vehicle and near the host vehicle's path of travel, such as a headlamp of an oncoming vehicle in a lane adjacent to (such as to the left of) the host vehicle or other vehicle lamp forward and/or to the left or right of the host vehicle) while processing other sub-arrays or pixels in a different manner.

In order to take advantage of the environmental protection offered by the vehicle cabin, the frequently cleaned optically clear path offered by the vehicle windshield (which is cleaned or wiped by the windshield wipers when the wipers are activated), and the relatively high vantage point offered at the upper region or top of the windshield, the headlamp control system or at least the imaging device or camera is preferably mounted centrally at or near the upper inside surface of the front windshield of a vehicle and with a forward field of view through the region cleaned or wiped by the windshield wipers. The imaging device may be mounted at an interior rearview mirror assembly (such as at a mounting bracket or base of the mirror assembly) or at an accessory module or windshield electronics module disposed at or near the interior rearview mirror assembly and at or near the interior surface of the vehicle windshield.

Automatic image-based high beam control systems, in which an image of the scene forward of the vehicle is focused by an optical system, may have a horizontal field of view equal to, but not limited to, approximately +/−24 degrees about the imaging system centerline. This horizontal field of view may be larger than (and may be substantially larger than) the horizontal extent of the high beam pattern, but optionally the high beam pattern itself may be moved left and right up to approximately 15 degrees in either direction by an adaptive front lighting (AFL) system. The image may be focused or imaged onto a rectangular array image capture device, such as, but not limited to, onto a 640×480 CMOS color imager, which captures image data and provides sequential frames of data indicative of the light energy reflected or emitted by objects in the region subtended by each element of the array. The image capture rate may be at a rate in the range of about 5 to 120 times per second or more, with processing being performed on the data to determine the presence, location and characteristics of objects and/or light sources within the monitored scene and to determine characteristics of the monitored scene, such as general illumination level, and to utilize several defined regions or zones of the monitored scene for various purposes. For example, the region of the scene that generally corresponds to the region of influence of the vehicle high beam pattern may be used to determine the appropriate high beam state of the headlamps depending on whether or not other road users are detected within that region. Optionally, the regions to the left and right of the first region may be used to anticipate the upcoming entry of other road users into the first region in order to facilitate a rapid and appropriate response upon entry or just prior to entry of the first region. The upper central region of the monitored scene may be used to determine ambient lighting conditions such that a first threshold may be established below which low beam headlights are activated, and a second threshold may be established above which high beam activation may be inhibited, while the lower horizontal portion of the ambient lighting condition detection region may be used to detect urban lighting conditions or the like. Other processing of the captured image data may be implemented depending on the particular application of the image sensor and processor, while remaining within the spirit and scope of the present invention.

The control system of the present invention thus captures images or generates image data indicative of the scene occurring forwardly of the vehicle and processes the image data to determine whether or not a headlamp or taillight of another vehicle is present, whereby the headlamps of the controlled vehicle may be adjusted between their high and low beams accordingly. The image processor processes one or more zones of interest or regions of interest to determine whether the detected light source is a headlamp or taillight of another vehicle traveling on the same road as the controlled vehicle (since a light detected that is remote from the particular or appropriate region of interest is not likely another vehicle light or is not likely relevant to the decision as to whether or not the controlled vehicle's headlamps should be adjusted). The control system thus may utilize aspects of the image systems and/or headlamp control systems described above to process different zones or regions of interest, and may ignore other regions of the captured images or process other regions at a reduced level (such as by utilizing aspects of the systems described in U.S. Pat. Nos. 5,550,677; 5,877,897; and/or 7,038,577, which are hereby incorporated herein by reference in their entireties).

In order to ensure that the region of interest or regions of interest being processed are representative of the appropriate region relative to the controlled vehicle and direction of travel thereof, the control system of the present invention is operable to provide an automatic alignment or correction factor of the image data captured by the image sensor. Thus, the various regions of interest within the scene monitored by the sensor are optimally maintained regardless of vehicle and high beam control system module geometric manufacturing and assembly tolerances, and other sources of misalignment, such as vehicle pitch and yaw variations due to a wide range of possible vehicle loading conditions.

Typical vehicle body structures, windshields and assembly systems of vehicles may contribute to geometric tolerances associated with the surface to which the headlamp control system module is attached. It is not unusual to encounter a total stack up of tolerances which result in a potential vertical and horizontal misalignment of approximately +/−4 degrees from the theoretically ideal condition. This is a significant value and may result in errors in processing the appropriate region of interest and/or determining lane widths and object sizes and distances and the like.

It is known to provide a mechanical adjustment means to allow for the correction of such a misalignment at the installation of a headlamp control system to the vehicle. Such mechanical adjustments are, however, often undesirable since it is often expensive to apply manual labor to the alignment of components on each vehicle equipped with a headlamp control system at the vehicle assembly plant or facility. Such adjustments are additionally undesirable since the alignment procedure is then subject to operator error.

Also, such adjustment will only correct for misalignment of the imaging device and system at the time of manufacturing of the vehicle, and will not correct or account for or adapt the system for misalignment that may occur during use, such as due to a physical or mechanical misalignment of the imaging device or due to different load balancing of the vehicle or replacement of the camera or mirror assembly or assembly module or windshield and/or the like. For example, in normal use, a typical vehicle experiences many different loading conditions which cause it to adopt a wide range of pitch and roll attitudes, causing an automatic headlamp control system of the vehicle to view the forward scene from perspectives different from the ideal, or initially considered design conditions, and thereby potentially resulting in different headlight actuation decisions than contemplated by the original system specification.

Thus, it is beneficial for the headlamp control system to include a feature which automatically compensates for an initial misalignment condition and additionally is capable of correcting for temporary vehicle conditions and re-installation misalignments which may occur during the use of the vehicle. In order to achieve optimum performance of the headlamp control system, it is desirable to determine which of the array elements of the image capture device fall into each of the defined regions of interest. Since the regions are defined relative to the forward scene, it is desirable to determine a particular point or area within the forward scene and to relate that point or area to a particular array element or photosensor or group of photosensors of the image capture device.

The particular point in the forward scene may be defined as a particular distant point or area which lies on the forward extended vehicle centerline on the horizontal plane which passes generally through the center of the optical system associated with the image capture device. When driving on a substantially flat and substantially straight road, the distant point may be the point within the forward scene at which the headlights of an oncoming vehicle or the tail lamps of a slower leading vehicle are first detected. As the distance between the controlled vehicle and target vehicle decreases, the image of the target vehicle expands within the imaged scene, towards the left if traveling in a leftward lane, centrally if in the same lane, and towards the right if traveling in a rightward lane. Thus, the described distant point may be called the focus of expansion or FOE.

In order to determine the imaging array element or pixel which subtends the FOE in the as assembled and as loaded vehicle, it is necessary to identify the array element or pixel or pixels which first detects a new light source (which has the potential to be a vehicular light source or headlamp or taillight) within that region of the monitored scene which could potentially contain the FOE, and to continue to track the detected light source as it expands in the image as the distance between the detected source and the controlled vehicle decreases until it is confirmed that the source is a headlamp or taillight of another vehicle (such as by utilizing aspects of the systems described in U.S. provisional applications, Ser. No. 60/845,381, filed Sep. 18, 2006; and Ser. No. 60/837,408, filed Aug. 11, 2006, and/or PCT Application No. PCT/US2007/075702, filed Aug. 10, 2007, and published Feb. 28, 2008 as PCT Publication No. WO 2008/024639, which are hereby incorporated herein by reference in their entireties). The control system may monitor the controlled vehicle trajectory until it reaches the point in the road where the new light source would have been initially detected in order to confirm that the road traveled for the duration of the monitoring period was substantially flat and substantially straight. If it is determined that the point or light source was a light source of a leading or approaching vehicle and the controlled vehicle and approaching vehicle are traveling along a substantially flat and substantially straight road, the location of the initial distant point or FOE may be compared to an expected location (the location of the pixel corresponding to the preset or expected FOE) to determine if there is an offset or error in the imaging device's or system's calibration. The control system optionally, and preferably, collects or processes or analyzes many new light sources and picks the best samples and averages them to arrive at the best or optimal or enhanced FOE.

If an offset between the actual or detected FOE and the expected or preset FOE is detected, the image processor determines the degree of offset and adjusts or shifts the regions of interest parameters or coordinates or targeted pixels to accommodate for the offset, such that the processor processes the image data captured by the pixels representative of the appropriate zones or regions of interest forwardly of the controlled vehicle for detecting headlamps of approaching vehicles and taillights of leading vehicles. For example, if the detected FOE is ten pixels to the left and five pixels down from the expected FOE, the processor may readily adjust the parameters or coordinates of the regions of interest by that amount (or by a scaled value based on the detected offset). Thus, the headlamp control system may adjust the processing to adapt to shifts or changes in the FOE of the imaging device and thus may do so electronically and without physical or mechanical adjustment of the imaging device relative to the vehicle.

The headlamp control system of the present invention thus provides a low cost processing adjustment to maintain processing of the appropriate regions of interest when detecting light sources or objects forwardly of the vehicle and determining whether or not the detected light sources or objects are leading vehicles or approaching vehicles along the road on which the controlled vehicle is traveling. The control system thus calibrates or adapts the image data or image processing to accommodate for manufacturing tolerances and/or physical misalignment that may occur during the camera and/or mirror or accessory module manufacture or during the vehicle manufacture, and to accommodate for misalignment or shifts in the principal viewing axis of the camera or imaging device due to different load balancing of the vehicle or distortion in shape of the headlamp control system assembly due to heating and/or other situations where the vehicle encounters or experiences a change in pitch or tilt or yaw of the vehicle.

Figure 4:
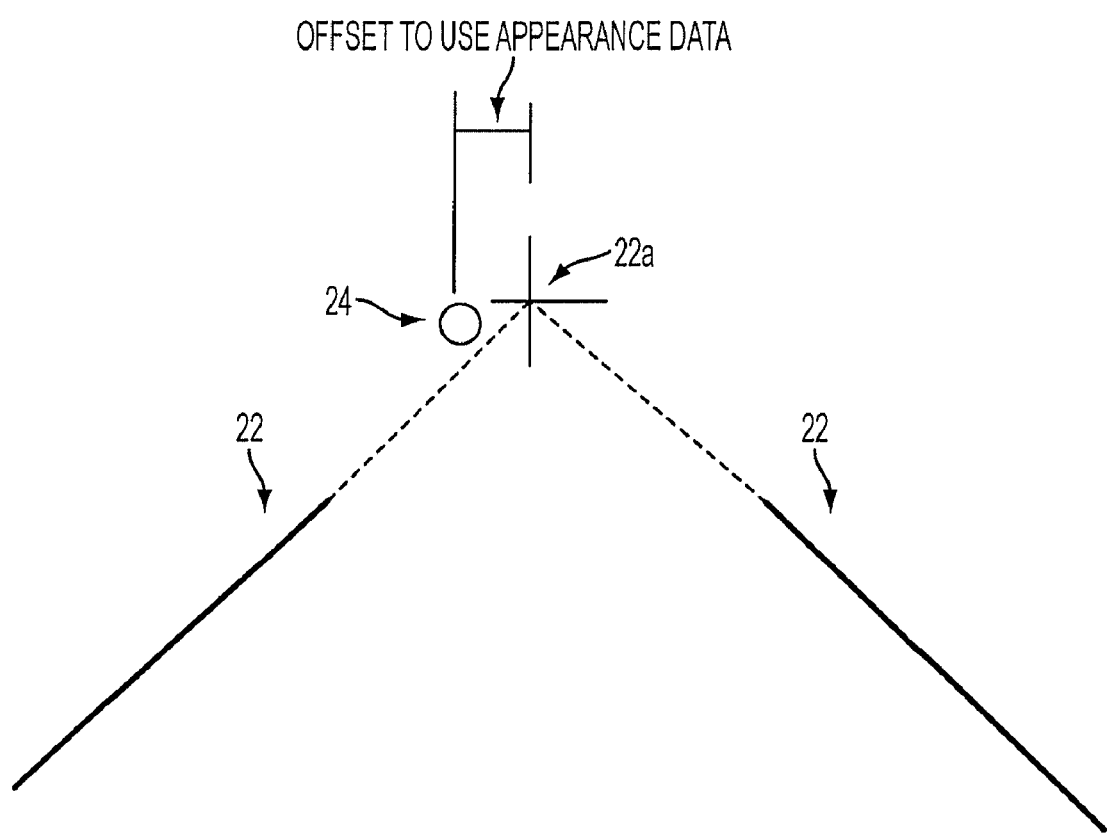
FIG. 4 is a schematic of a determination of an offset of a focus of expansion for the control system of the present invention.

Optionally, the control system may be adjusted in response to a detection of lane markers, such as along a straight and/or flat road (or optionally along a curved road and optionally in conjunction with a steering angle of the vehicle). For example, and with reference to FIG. 4, the system may detect lane markers 22 along the lane in which the controlled vehicle is traveling and, if the lane markers are substantially straight, may determine an intersection 22a of the lane markers. The control system may detect headlamps in front of the vehicle and may monitor the appearance point 24 of the detected headlamps. The system may monitor the appearance point and the intersection point as it travels toward and past the physical locations corresponding to the monitored points in the captured images, and if it is determined that the road or lane was substantially straight, the offset between the actual FOE and the expected FOE may be determined. The control system collects determined lane-marker-based FOE samples and rejects the error samples and averages them to arrive at a best or optimal or enhanced lane-marker-based FOE.

Optionally, the control system may utilize a weighted sum calculation of data representative of the intersection point and the (appearance point plus offset) to determine the actual FOE, depending on the particular application. For example, the adaptive FOE may be based on a detection of the appearance (initial detection) of lights and disappearance of lights (when the lights are out of the range of the sensor and are no longer detected) in front of the vehicle and a detection of the lane markers along the road in front of the vehicle, and may be calculated, for example, via the following equations:

$$AFOE_{ROW}=(a*[\text{LaneMark Row+Offset}u]+b*[\text{Headlight Appear Row+Offset}v]+c*[\text{Taillight Disappear Row+Offset}w])/(a+b+c); \text{ and} \quad (1)$$

$$AFOE_{COLUMN}=(d*[\text{LaneMark Column+Offset}x]+e*[\text{Headlight Appear Column+Offset}y]+f*[\text{Taillight Disappear Column+Offset}z])/(d+e+f); \quad (2)$$

where a, b, c, d, e and f are parameter weights that depend on the particular application. Other equations may be utilized to substantially estimate or calculate the present FOE of the imaging device, such as based on the detection of lane markers and/or light sources and/or the like in the forward field of view. Since this method uses either or both lane markers or vehicle appearance/disappearance, the system can work for environments without lane markers or for environments without initial other-vehicle presence.

Optionally, the control system may be adjusted in response to vehicle pitch information from a bus or accelerometer, and/or vehicle roll information from an accelerometer or bus information of the vehicle, and/or vehicle yaw information from an accelerometer or bus information of the vehicle. Optionally, the system may only monitor for new light sources when the vehicle is traveling in a substantially straight line (such as when the steering wheel angle is between, for example, about 0+/−10 degrees for a vehicle with steering ratio of about 17, or at or between any other suitable or selected threshold angle or angles depending on the particular application of the control system). Thus, adjustment and/or alignment of the image sensor may occur by tracking movement of light sources through the images when the vehicle is traveling substantially straight, so that the control may compare the tracked light sources to expected locations and paths through the captured images as the vehicle moves along the substantially straight path and may adjust the processing parameters of the image processor and imaging sensor accordingly.

Optionally, the control system may determine the actual FOE and offset along curved road sections in response to the lane marker detection and/or a steering angle input, whereby the system may monitor the detected appearing light source and monitor its initial or appearance location as the controlled vehicle approaches the initial location. By taking into account the steering angle of the vehicle as the vehicle travels toward the initial or appearance location of the light source, the control system may monitor or track the initial location to determine if the controlled vehicle approaches or arrives at or near that location. The control system may also determine if the detected light source was a headlamp of an approaching vehicle or taillight of a leading vehicle and, if so, may determine the offset and adjust or adapt the image processing accordingly.

The automatic adjustment or correction or adaptation of the image processor in response to a detected offset between a detected FOE and an expected FOE allows the control system of the present invention to utilize various cameras or imaging devices, such as aftermarket devices or cell phone cameras or the like. For example, an aftermarket camera may be installed in the vehicle with a generally forward field of view in the direction of travel of the vehicle, and the system may, as the vehicle is then driven, determine an offset or error in the expected FOE and readily compensate for such offset, without requiring any further manual input or physical adjustments.

Figure 5:
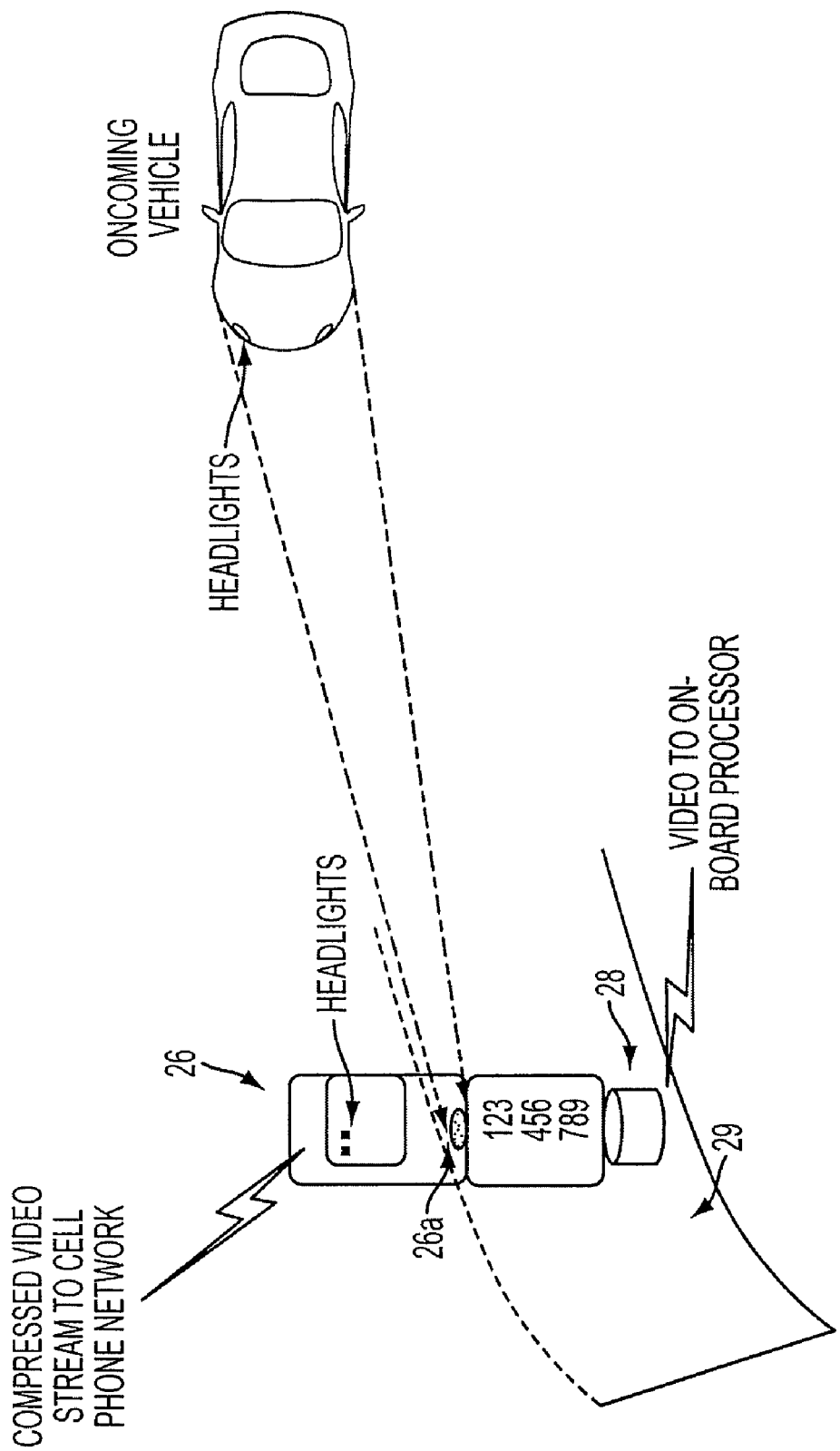
FIG. 5 is a schematic of a headlamp control system utilizing a cell phone camera for capturing images of a forward field of view.

Thus, it is envisioned that any imaging device (such as, for example, a cell phone camera) may be utilized for the imaging system or headlamp control system of the present invention. For example, and with reference to FIG. 5, a cell phone 26 may be docked at (such as at a phone connector mount or port 28 or the like at the vehicle instrument panel or dashboard 29 or mirror assembly or accessory module or console or the like) or in communication with an image processor that processes the images captured by the cell phone camera 26a in a similar manner as described above, and determines the current FOE for the cell phone camera at its present orientation relative to the vehicle and determines the appropriate zones of interest or regions of interest for processing the image data to determine if detected light sources in the forward field of view are representative of a headlamp of an approaching vehicle or taillight of a leading vehicle. The cell phone may transmit a compressed video stream (such as, for example, at about 264 Hz) to a cell phone network, and/or may communicate video signals to an on-board or vehicle-based processor.

It is further envisioned that the adaptive FOE process of the present invention allows for the use of various aftermarket cameras and/or cell phone cameras for various imaging systems or applications, such as adaptive front lighting systems or lane departure warning systems or object detection systems or collision avoidance systems or the like, since the camera (such as a cell phone and camera) may be located at or in or mounted at the vehicle and the processing of the image data may be adapted to automatically accommodate for and correct for any misalignment or mis-mounting or mis-positioning of the camera. Optionally, aspects of the adaptive FOE system described above may be utilized for cameras (such as OEM cameras or aftermarket cameras or cell phone cameras or the like) having a rearward field of view so that the processing of the captured images is corrected or adapted and the images are processed accordingly, such as for a rear vision system or backup aid or the like, and/or may be utilized for cameras having a field of view directed inside the vehicle, such as for interior cabin monitoring systems or the like (such as utilizing aspects of the systems described in U.S. Pat. Nos. 5,760,962; 5,877,897; and/or 6,690,268, which are hereby incorporated herein by reference in their entireties). The image data from the cell phone camera (or other camera) may be communicated wirelessly (such as via a short-range radio frequency communication, such as via a BLUETOOTH® communication protocol or the like) or via a wired connection (such as via a docking port or USB port or the like at the vehicle) to a vehicle-based or onboard processor (such as processor 13 described above), or compressed video data or image output of the camera may be streamed to a cell phone network or the like.

Optionally, the control system may adjust the zones of interest or regions of interest in the captured images in response to an input representative of the vehicle trajectory, such as in response to a steering angle of the vehicle or steering wheel angle of the vehicle, such as by utilizing aspects of the systems described in U.S. patent application Ser. No. 11/315,675, filed Dec. 22, 2005, and published Aug. 17, 2006 as U.S. Publication No. US-2006-0184297; and/or U.S. provisional applications, Ser. No. 60/845,381, filed Sep. 18, 2006; and Ser. No. 60/837,408, filed Aug. 11, 2006, and/or PCT Application No. PCT/US2007/075702, filed Aug. 10, 2007, and published Feb. 28, 2008 as PCT Publication No. WO 2008/024639, which are all hereby incorporated herein by reference in their entireties. For example, when the controlled vehicle is traveling along a curved road, the zones of interest or regions of interest may be adjusted or offset (i.e., the image processor may process different groups of pixels corresponding to the different zones or regions of interest) so that the image processor processes the adjusted or offset zones or regions of interest to detect vehicles along a curved road. Such an adjustment of the zones of interest parameters or pixel locations may occur when the control system determines that the controlled vehicle is traveling along a curved road, such as in response to a steering angle input or lane detection input or the like. Optionally, the regions of interest may be reduced or shrunk (or optionally extended) at the corresponding side regions depending on the direction of the curve along which the vehicle is traveling.

Optionally, the control system of the present invention may adjust or adapt other processing parameters based on previous image processing. For example, the control system may process a large window or region of interest and may adapt the region of interest to a smaller region or window if a light source is detected. For example, if a detected light source is identified as headlamps of an approaching vehicle, the region of interest may be adapted from a large region or zone or window to a smaller or predicted region that is representative of where the headlamps of an approaching vehicle should be located relative to the controlled vehicle, such as down and to the left in the captured image (for a detected taillight, the adaptive region or window may be generally downward at or near a center line of the image as the controlled vehicle approaches a leading vehicle). If the adapted or smaller or inner or predicted region or window no longer detects a light source or object, the control system may resume processing of the larger region of interest or window to determine if other light sources or objects are present. Optionally, the exposure may be adjusted or adapted from one frame to the next, such as if an approaching headlamp is detected, for example, the exposure may be less for the subsequent frames as the headlamp moves closer to the controlled vehicle. For detected taillights, the change in exposure may be reduced or inhibited, since the taillights typically move generally with the controlled vehicle and do not approach the controlled vehicle as rapidly as to headlamps of approaching vehicles.

The driving side of the road varies by countries of the world (for example, in the United States, the vehicles are driven on the right side of the road). It is desirable to support left and right driving side of road to reduce engineering and manufacturing cost. Thus, it is beneficial for the head lamp control system to include a feature that automatically detects the driving side of the road. The control system thus may be operable to process the image data set to detect the new light source and identify the head light of the oncoming vehicle. The control system tracks the head light of the detected oncoming vehicle and stores the trajectory of headlight. The driving side of the vehicle (the side of the road along which the vehicle is traveling) is identified by analyzing a predetermined amount of the trajectories of the oncoming vehicles. If the driving side is on the right side of the road, then the oncoming vehicles will pass the host vehicle on the left, and vice versa. Optionally, the control system may detect the driving side only by analyzing the location of appearance of new headlights in image data, since the appearance of new head light sources is biased toward one side of the captured image or image data according the driving side of the road when the vehicle is traveling along a substantially flat and straight road. Optionally, the control system may be responsive to a global positioning system input and may determine the driving side of the road on which the vehicle is traveling based on the geographical location of the vehicle and the driving rules and regulations of that geographical location or region.

The automatic high beam system or automatic headlamp control system may be optimized to adapt the vehicle for enhanced performance for the particular road (and side of the road) along which the vehicle is being driven. For example, the control system may modify many calibrations or parameters such as, but not limited to, different zones or sub-arrays of image data, weighting factors of different zones of image data, offset of the FOE, automotive light sources acceptance parameters, lane marker detection and tracking of objects and light sources and/or the like, in order to adapt the system for enhanced performance depending on which side of the road the host vehicle is driven on.

Optionally, the control system of the present invention may be operable to provide a low-cost processing of the image data via processing captured frames of image data at different resolution levels, such as at least two different resolutions or resolution levels. For example, the control system may process images at a higher resolution level (where the imaging device may be processed, for example, as a pixelated array of 640×480 pixels), at a medium or intermediate resolution (where the imaging device may be processed, for example, as a pixelated array of 320×240 pixels), and at a lower resolution (where the imaging device may be processed, for example, as a pixelated array of 160×120 pixels). Such a processing technique allows the processor to use the same classifier (such as the same window size or mask size, such as about a 2×3 pixel mask for detecting a distant taillight) for detecting and identifying taillights (or other light sources) at each distance or range, and thus may substantially reduce the memory requirements of the processor.

Typically, if a processor is to identify a taillight that is about 200 meters (or thereabouts) in front of the controlled vehicle, the processor may utilize a 2×3 pixel mask to determine if the detected light source is about the expected size of a taillight to assist in correctly identifying the taillights. However, if the light source is closer to the vehicle, such as at about 100 meters or thereabouts in front of the controlled vehicle, the processor would process the image data with a larger mask or window because the light source would be larger when it is closer to the controlled vehicle. When the light source is even closer, such as about 50 meters or less, to the controlled vehicle, an even larger window or mask is utilized to identify the detected light source. Thus, the control system requires sufficient memory capability to store the different window sizes for detecting the various light sources at various distances in front of the controlled vehicle. Such memory or data storage can be costly and thus may add to the cost of the headlamp control system (or other vision-based system).

However, by processing the captured images at different resolutions (such as a higher resolution, a medium resolution and a lower resolution), the system may generally equalize the sizes of the imaged objects or light sources for the various distances from the controlled vehicle, so that only a single sized mask or window need be utilized for identifying a particular light source, such as a taillight of a leading vehicle. This is because a taillight at about 200 meters may take up a window of about 2×3 pixels of a 640×480 higher resolution image, while a taillight at about 100 meters or thereabouts may take up a window of about 2×3 pixels of a 320×240 medium resolution image (which would be about a 4×6 pixel window if it were a higher resolution image), and a taillight at about 50 meters or less may take up a window of about 2×3 pixels of a 160×120 lower resolution image (which would be about a 8×12 pixel window if it were a higher resolution image).

Thus, by processing the different resolution images, the control system may utilize the same mask or window or classifier for identifying a detected light source. Although the intensity of the detected light sources would be different (such as, for example, the intensity of the light source of the medium resolution image may be eight times the intensity of the light source of the low resolution image and the intensity of the light source of the high resolution image may be 64 times the intensity of the light source of the low resolution image), this can be readily accounted for when detecting the light source and identifying the detected light source. Thus, when a light source is detected that may be a taillight of a leading vehicle, the processor may process the image data with a single classifier (such as for classifying the light source as a taillight) regardless of the distance to the detected light source from the controlled vehicle, and thus, the memory requirements of the system for multiple classifiers may be substantially reduced to reduce the cost of the control system.

Optionally, the control system may be operable to superimpose a code or flicker on the headlight beams to communicate a code or message to control systems of other vehicles or of roadside monitors or stations, such as by utilizing aspects of the systems described in U.S. Pat. No. 7,004,606, which is hereby incorporated herein by reference in its entirety. For example, the headlamps (or other vehicle lights) could be used to signal other drivers with "messages" which other vehicle's machine vision systems could decode, while typical drivers without such systems are unaware of the communication system. Such a code would be camouflaged to people viewing the headlamps or other lights, but visible to the machine vision systems of the other vehicles. Different flicker rates or different color combinations or spectral signature of the lights may communicate different codes, and the codes may be preset codes (such as, for example, a code that communicates to the driver of the other vehicle or vehicles that there is an accident ahead or the like), or may be entered by the driver of the controlled vehicle (such as via a voice input or manual input or the like).

Thus, with vehicles inside the line of sight distances, messages may be sent from the controlled vehicle to other vehicles via the code embedded in or superimposed on the output signal or illumination signal of the vehicle lights. For example, a code or message may be communicated from a controlled vehicle passing an accident to all similarly equipped oncoming traffic to alert the oncoming traffic of the accident. The code may comprise a color change (such as a subtle color change) in the color of the light emitted by the vehicle light source or a flicker (such as a high frequency flicker that is not readily noticeable or discernible to a human observer) or the like, and may be readily detected and identified or decoded by a similar control system of another vehicle. For example, the vehicle light source may comprise yellow and blue LEDs flickering at a predetermined rate and pattern and can thus encode information or data or messages which would look like a typical white HID or halogen headlight to human observers. Human perception of flickering in this color pair is worse than other colors which could also produce white, such as those nearer the red and green colors. This flicker rate of the yellow and blue LEDs thus may be lower than other color combinations (while still avoiding detection by the human observers), such as less than about 60 Hz.

For communicating messages or codes rearwardly, the taillights may also or otherwise be flickered or adjusted or coded to communicate a message or data. Red taillight location in color space may not be optimal for flickering different colors, but using flicker rates above about 60 Hz can provide the desired communication means while limiting or substantially avoiding human detection. Optionally, the light sources may flicker or may have superimposed thereon an illumination output in the infrared or near infrared range of the spectrum, where humans have poor sensitivity, and where the imaging devices may be highly sensitive.

Optionally, the control system of the present invention may be operable to determine if a pixel or pixels of the imaging array is either inoperable or "bad" or blocked, so that the control system may ignore the bad/blocked pixel output to avoid adversely affecting averages of pixel output intensities during the image processing. The bad pixel detection process or algorithm may be performed periodically when the system is operating. For example, a captured frame or image may be dedicated to bad pixel detection. If a bad pixel or pixels is/are detected, averaging of the output intensities of the pixels surrounding the bad pixel may be performed to accommodate or replace the bad or inoperable pixel.

It is further envisioned that the control system may be operable to determine if some or all of the pixels of the imaging array are blocked (such as via an object or dirt or debris at the vehicle windshield or the like) and to adapt the image processing accordingly or notify or alert the driver of the vehicle that such blockage has occurred. For example, a partial or total day blockage algorithm may be run during daytime lighting conditions, such as in response to a user input or on demand, while a partial or total night blockage algorithm may be run when the ambient condition is indicative of nighttime lighting conditions. When the total blockage algorithm is run, the number of pixels above an intensity threshold may be counted for a captured image or frame, and if, over a number of frames, the count of the bright pixels is continuously below a threshold, the control system may conclude that the imaging device substantially or totally blocked. When the partial blockage algorithm is run, the control system may perform region-based processing to take into account intensity variations in different regions of the pixelated imaging array. Based on intensity variations with neighboring or adjacent regions and the continuity of the variations over time, the control may determine that the imaging array is partially blocked. The control system may process the blocked pixel region in a night mode to reduce or substantially preclude the possibility of a false blockage detection.

If either partial or total blockage is detected or determined, the system may adapt the image processing to accommodate the blocked pixels, or the system may alert the driver of the vehicle that the pixels are blocked so that the driver or user may unblock the imaging device (such as via cleaning the windshield of the vehicle), or the system may actuate the vehicle windshield wipers to clear the windshield at the imaging device or the like, or the system may actuate a blower system (such as a defogger system or the like) of the vehicle to direct or force or blow air toward the detected blockage to clear the windshield or window or area in the forward field of view of the imaging device. Optionally, the control thus may detect that at least a portion of the imaging device or photosensor array is blocked and may switch to a low beam mode in response to the detection (so as to allow the system to confirm the existence of the blockage without the high beams on during this period of time), and the system may at least one of (a) alert the driver of the subject vehicle of the detected blockage so that he or she can clean the windshield or sensor or otherwise remove the blockage or actuate the wipers and/or related system of the vehicle to remove the blockage; (b) automatically actuate a wiper (such as the windshield wipers) of the vehicle to remove the blockage from the forward field of view of the imaging device; and (c) automatically actuate a blower system of the vehicle to remove or dissipate the blockage from the forward field of view. The system or control may also detect that the blockage has been removed from the forward field of view and may resume the normal functionality of the headlamp control system and/or the wiper system of the vehicle and/or the blower system of the vehicle.

Optionally, the imaging sensor (and/or aspects of the control system described above) may be suitable for use in connection with other vehicle imaging systems, such as, for example, a blind spot detection system, where a blind spot indicator may be operable to provide an indication to the driver of the host vehicle that an object or other vehicle has been detected in the lane or area adjacent to the side of the host vehicle. In such a blind spot detector/indicator system, the blind spot detection system may include an imaging sensor or sensors, or ultrasonic sensor or sensors, or sonar sensor or sensors or the like. For example, the blind spot detection system may utilize aspects of the blind spot detection and/or imaging systems described in U.S. Pat. Nos. 7,038,577; 6,882,287; 6,198,409; 5,929,786; and/or 5,786,772, and/or U.S. patent application Ser. No. 11/315,675, filed Dec. 22, 2005, and published Aug. 17, 2006 as U.S. Publication No. US-2006-0184297; and/or Ser. No. 11/239,980, filed Sep. 30, 2005, and/or U.S. provisional applications, Ser. No. 60/696, 953, filed Jul. 6, 2005; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or PCT Application No. PCT/US2006/026148, filed Jul. 5, 2006, and published Jan. 11, 2007 as PCT Publication No. WO 2007/ 005942, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610; 6,757,109; and/or 7,005, 974, and/or of the rain sensors described in U.S. Pat. Nos. 6,250,148 and 6,341,523, and/or of other imaging systems, such as the types described in U.S. Pat. Nos. 7,123,168; 6,353,392; and/or 6,313,454, with all of the above referenced U.S. patents, patent applications and provisional applications and PCT applications being commonly assigned and being hereby incorporated herein by reference in their entireties.

Optionally, the optical system may be held by features of a housing assembly of an interior rearview mirror assembly of an accessory module or the like. The housing assembly may utilize aspects of the modules or assemblies described in U.S. Pat. Nos. 7,004,593; 6,968,736; 6,877,888; 6,824,281; 6,690, 268; 6,672,744; 6,593,565; 6,516,664; 6,501,387; 6,428,172; 6,386,742; 6,341,523; 6,329,925; and 6,326,613; 6,250,148; and 6,124,886, and/or U.S. patent application Ser. No. 10/538,724, filed Jun. 13, 2005 by Hutzel et al. for ACCESSORY SYSTEM FOR VEHICLE, and/or Ser. No. 11/201, 661, filed Aug. 11, 2005 by DeWard et al. for ACCESSORY MODULE FOR VEHICLE, and/or PCT Application No. PCT/US03/40611, filed Dec. 19, 2003 by Donnelly Corp. et al. for ACCESSORY SYSTEM FOR VEHICLE; PCT Application No. PCT/US03/03012, filed Jan. 31, 2003 by Donnelly Corporation for VEHICLE ACCESSORY MODULE, and/or PCT Application No. PCT/US04/15424, filed May 18, 2004 by Donnelly Corporation et al. for MIRROR ASSEMBLY FOR VEHICLE, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, the mirror assembly and/or accessory module or windshield electronics module may include one or more displays, such as for displaying the captured images or video images captured by the imaging sensor or sensors of the vehicle, such as the displays of the types disclosed in U.S. Pat. Nos. 7,004,593; 5,530,240 and/or 6,329,925, which are hereby incorporated herein by reference, and/or display-on-demand or transflective type displays, such as the types disclosed in U.S. Pat. Nos. 7,195,381; 6,690,268; 5,668,663 and/or 5,724,187, and/or in U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY, and/or PCT Application No. PCT/US03/40611, filed Dec. 19, 2003 by Donnelly Corp. et al. for ACCESSORY SYSTEM FOR VEHICLE, and/or PCT Application No. PCT/US2006/018567, filed May 15, 2006 by Donnelly Corp. et al., which are all hereby incorporated herein by reference, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and/or U.S. patent application Ser. No. 10/538,724, filed Jun. 13, 2005 by Hutzel et al. for ACCESSORY SYSTEM FOR VEHICLE; and/or Ser. No. 11/284,543, filed Nov. 22, 2005, now U.S. Pat. No. 7,370,983, and/or U.S. provisional applications, Ser. No. 60/732,245, filed Nov. 1, 2005; Ser. No. 60/759,992, filed Jan. 18, 2006; and/or Ser. No. 60/836,219, filed Aug. 8, 2006 by Weller et al. for INTERIOR REARVIEW MIRROR ASSEMBLY WITH DISPLAY, which are hereby incorporated herein by reference.

The imaging sensor may be incorporated at or in an accessory module or windshield electronics module (such as described above), or may be incorporated at or in an interior rearview mirror assembly of the vehicle, while remaining within the spirit and scope of the present invention. Optionally, the mirror assembly and/or module may support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 7,195,381; 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669,698, and/or U.S. patent application Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference, may be included in the mirror assembly or module. The illumination sources and/or the circuit board may be connected to one or more buttons or inputs for activating and deactivating the illumination sources. Optionally, the mirror assembly or module may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 by Donnelly Corp. et al. for MICROPHONE SYSTEM FOR VEHICLE. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a memory mirror system, such as disclosed in U.S. Pat. No. 5,796,176, a hands-free phone attachment, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly or module may include one or more user inputs for controlling or activating/deactivating one or more electrical accessories or devices of or associated with the mirror assembly or module or vehicle. The mirror assembly or module may comprise any type of switches or buttons, such as touch or proximity sensing switches, such as touch or proximity switches of the types described in PCT Application No. PCT/US03/40611, filed Dec. 19, 2003 by Donnelly Corporation for ACCESSORY SYSTEM FOR VEHICLE; and/or U.S. Pat. Nos. 6,001,486; 6,310,611; 6,320,282; and 6,627,918; and/or U.S. patent application Ser. No. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021, 065, filed Dec. 23, 2004, now U.S. Pat. No. 7,255,451; and/or Ser. No. 11/140,396, filed May 27, 2005, now U.S. Pat. No. 7,360,932, which are hereby incorporated herein by reference, or the inputs may comprise other types of buttons or switches, such as those described in U.S. patent application Ser. No. 11/029,695, filed Jan. 5, 2005, now U.S. Pat. No. 7,253,723; and/or Ser. No. 11/451,639, filed Jun. 13, 2006, which are hereby incorporated herein by reference, or such as fabric-made position detectors, such as those described in U.S. Pat. Nos. 6,504,531; 6,501,465; 6,492,980; 6,452,479; 6,437,258; and 6,369,804, which are hereby incorporated herein by reference. Other types of switches or buttons or inputs or sensors may be incorporated to provide the desired function, without affecting the scope of the present invention.

Optionally, any such user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al. for GARAGE DOOR OPENING SYSTEM FOR VEHICLE, which are hereby incorporated herein by reference. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004,593, and/or U.S. patent application Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/964,512, filed Oct. 13, 2004, now U.S. Pat. No. 7,308,341; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference.

Optionally, the accessory module may utilize aspects of other accessory modules or windshield electronics modules or the like, such as the types described in U.S. patent application Ser. No. 10/958,087, filed Oct. 4, 2004 by Schofield et al. for VEHICLE ACCESSORY MODULE, now U.S. Pat. No. 7,188,963; and/or Ser. No. 11/201,661, filed Aug. 11, 2005, and/or U.S. Pat. Nos. 7,004,593; 6,824,281; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference.

The reflective element of the rearview mirror assembly of the vehicle may comprise an electro-optic or electrochromic reflective element or cell, such as an electrochromic mirror assembly and electrochromic reflective element utilizing principles disclosed in commonly assigned U.S. Pat. Nos. 7,195,381; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 11/021,065, filed Dec. 23, 2004, now U.S. Pat. No. 7,255,451; Ser. No. 11/226,628, filed Sep. 14, 2005, and/or PCT Patent Application No. PCT/US2006/018567, filed May 15, 2006 by Donnelly Corp. et al., which are all hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 by Donnelly Corp. et al. for MIRROR REFLECTIVE ELEMENT ASSEMBLY, which are all hereby incorporated herein by reference.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005, which are hereby incorporated herein by reference. Optionally, the reflective element may include indicia formed at and viewable at the reflective element, such as by utilizing aspects of the reflective elements described in PCT Patent Application No. PCT/US2006/018567, filed May 15, 2006 by Donnelly Corp. et al., which are hereby incorporated herein by reference.

Optionally, the reflective element of the mirror assembly may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/709,434, filed May 5, 2004 by Lynam for MIRROR REFLECTIVE ELEMENT; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference, without affecting the scope of the present invention.

Changes and modifications to the specifically described embodiments may be carried out without departing from the principles of the present invention, which is intended to be limited by the scope of the appended claims as interpreted according to the principles of patent law including the doctrine of equivalents.

The invention claimed is:

1. A vehicular imaging system comprising
a photosensor array comprising a plurality of photosensor elements, said photosensor array having a field of view forward of the vehicle that is generally in line with the vehicle's primary direction of forward travel, said photosensor array capturing images of an area encompassed by said forward field of view;
a control responsive to an output of said photosensor array, said control processing an image data set indicative of captured images;
wherein said control processes a reduced image data set of said image data set to determine whether an object of interest is within a target zone of said captured image, said reduced image data set being representative of a portion of said captured images as captured by a particular grouping of said photosensor elements; and
wherein said control adjusts said reduced image data set so as to be representative of a portion of said captured images as captured by a different particular grouping of said photosensor elements, said control adjusting said reduced image data set in response to a determination of a change in a focus of expansion of said captured images;
wherein said focus of expansion comprises at least one photosensor element that initially detects a new light source in said field of view, and wherein said control tracks said new light source as it approaches the subject vehicle to confirm that said new light source is indicative of an object of interest, wherein said control compares a location of said new light source to an expected location of the light source to determine if there is an offset, said control adjusting said reduced data set in response to determination of said offset.

2. The vehicular imaging system of claim 1, wherein said control is operable to adjust a state of a headlamp beam in response to said image processing.

3. The vehicular imaging system of claim 2, wherein said control is operable to detect that at least a portion of said photosensor array is blocked and switch to a low beam mode in response to said detection, and wherein said imaging system at least one of (a) alerts the driver of the subject vehicle of the detected blockage, (b) actuates a wiper of the vehicle to remove the blockage from the forward field of view of said photosensor array and detects that the blockage has been removed and resumes normal functionality of said wiper, and (c) actuates a blower system of the vehicle to remove the blockage from the forward field of view and detects that the blockage has been removed and resumes normal functionality of said blower system.

4. The vehicular imaging system of claim 1, wherein said control is operable to detect that at least a portion of said photosensor array is blocked, and wherein said imaging system at least one of (a) alerts the driver of the subject vehicle of the detected blockage, (b) actuates a wiper of the vehicle to remove the blockage from the forward field of view of said photosensor array and detects that the blockage has been removed and resumes normal functionality of said wiper, and (c) actuates a blower system of the vehicle to remove the blockage from the forward field of view and detects that the blockage has been removed and resumes normal functionality of said blower system.

5. The vehicular imaging system of claim 1, wherein said control is operable to process said reduced image data set more than other image data to detect edges of objects present exteriorly of the vehicle and within said target zone, said other image data being representative of areas of said captured image outside of said target zone.

6. The vehicular imaging system of claim 1, wherein said control determines that said new light source is representative of a light source of a leading or approaching vehicle and the controlled vehicle and approaching vehicle are traveling along a substantially flat and substantially straight road, wherein said controlled vehicle incorporates the vehicular imaging system.

7. The vehicular imaging system of claim 6, wherein said control adjusts said reduced data set in response to a weighted sum calculation of data obtained from the offset determination.

8. The vehicular imaging system of claim 1, wherein said control adjusts said reduced data set in response to a detection of lane markers.

9. The vehicular imaging system of claim 8, wherein said control adjusts said reduced data set in response to a weighted sum calculation of data obtained from the detection of lane markers.

10. The vehicular imaging system of claim 1, wherein said photosensor array comprises one of an aftermarket imager and a cell phone imager.

11. The vehicular imaging system of claim 1, wherein said control is operable to selectively process said output of said photosensor array as an output from said photosensor array at least two different resolutions.

12. The vehicular imaging system of claim 1, wherein said control is operable to encode signals into the light output of the subject vehicle to allow an imaging system of another vehicle to detect said encoded signal.

13. The vehicular imaging system of claim 1, wherein said control is operable to detect and ameliorate the bad pixels of an imaging system.

14. The vehicular imaging system of claim 1, wherein said control is operable to detect the driving side of the road and wherein said control is operable to adapt at least one of said processing and adjusting responsive to the detected driving side of the road.

15. A vehicular imaging system comprising:

a photosensor array comprising a plurality of photosensor elements, said photosensor array having a field of view forward of the vehicle that is generally in line with the vehicle's primary direction of forward travel, said photosensor array capturing images of an area encompassed by said forward field of view;

a control responsive to an output of said photosensor array, said control processing image data indicative of captured images;

wherein said control is operable to selectively process said output of said photosensor array as an output from said photosensor array at least two different resolutions; and wherein said control computes a distance between said vehicle and a particular object of interest in the forward field of view and selects at least one of the at least two different resolutions based on said distance, said control comparing said object of interest at said selected resolution against an object mask of a predetermined array size and content which is irrespective of said distance.

16. The vehicular imaging system of claim 15, wherein said at least two different resolutions comprise (a) an output of a higher resolution photosensor array, (b) an output of a medium resolution photosensor array, and (c) an output of a lower resolution photosensor array.

17. The vehicular imaging system of claim 15, wherein said control processes said output of said photosensor array at different resolutions in response to one of (a) a location of a detected light source and (b) a distance between the subject vehicle and a detected light source.

18. The vehicular imaging system of claim 15, wherein said control processes a reduced image data set of said image data set to determine whether an object of interest is within a target zone of said captured image, said reduced image data set being representative of a portion of said captured images as captured by a particular grouping of said photosensor elements.

19. The vehicular imaging system of claim 18, wherein said control adjusts said reduced image data set so as to be representative of a portion of said captured images as captured by a different particular grouping of said photosensor elements, said control adjusting said reduced image data set in response to a determination of a change in a focus of expansion of said captured images.

* * * * *